(12) United States Patent
Bian et al.

(10) Patent No.: US 11,079,544 B2
(45) Date of Patent: Aug. 3, 2021

(54) WAVEGUIDE ABSORBERS

(71) Applicant: GLOBALFOUNDRIES U.S. INC., Santa Clara, CA (US)

(72) Inventors: Yusheng Bian, Ballston Lake, NY (US); Bo Peng, Wappingers Falls, NY (US); Michal Rakowski, Ballston Spa, NY (US); Ajey Poovannummoottil Jacob, Watervliet, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 16/531,819

(22) Filed: Aug. 5, 2019

(65) Prior Publication Data
US 2021/0041628 A1     Feb. 11, 2021

(51) Int. Cl.
*G02B 6/12*     (2006.01)
*G02B 6/24*     (2006.01)

(52) U.S. Cl.
CPC ................... *G02B 6/243* (2013.01)

(58) Field of Classification Search
CPC ....... H01L 2924/00; G02B 6/12; G02B 6/243; G02B 6/26
See application file for complete search history.

(56) References Cited

U.S. PATENT DOCUMENTS

| | | | |
|---|---|---|---|
| 2,557,110 A | 6/1951 | Jaynes | |
| 2,619,538 A | 11/1952 | Grant | |
| 3,787,871 A | 1/1974 | Reese | |
| 4,799,031 A | 1/1989 | Lang et al. | |
| 6,147,349 A | 11/2000 | Ray | |
| 6,180,945 B1 | 1/2001 | Barton et al. | |
| 6,590,697 B2 * | 7/2003 | Vaganov | G02B 6/266 |
| | | | 359/290 |
| 7,002,429 B2 | 2/2006 | Asao et al. | |
| 7,361,526 B2 | 4/2008 | Maa et al. | |
| 7,397,101 B1 | 7/2008 | Masini et al. | |
| 7,777,250 B2 | 8/2010 | Lochtefeld | |
| 7,790,495 B2 | 9/2010 | Assefa et al. | |
| 7,795,064 B2 | 9/2010 | Pan et al. | |
| 9,064,699 B2 | 6/2015 | Wang et al. | |
| 9,383,512 B2 * | 7/2016 | Evans | G02B 6/12004 |
| 9,864,138 B2 | 1/2018 | Coolbaugh et al. | |
| 10,157,947 B2 | 12/2018 | Chen et al. | |
| 10,359,569 B2 * | 7/2019 | Dumais | G02B 6/122 |
| 10,600,839 B2 | 3/2020 | Kurokawa | |

(Continued)

OTHER PUBLICATIONS

Yu, "High-Efficiency p-i-n Photodetectors on Selective-Area-Grown Ge for Monolithic Integration", IEEE Electron Device Letters, vol. 30, Issue 11, Nov. 2009, 4 pages.

(Continued)

*Primary Examiner* — Jennifer Doan
(74) *Attorney, Agent, or Firm* — Anthony Canale; Andrew M. Calderon; Roberts Calderon Safran & Cole, P.C.

(57) ABSTRACT

The present disclosure relates to semiconductor structures and, more particularly, to Waveguide absorbers and methods of manufacture are provided. The waveguide structure includes a photonics component and a spirally configured waveguide absorber coupled to a node of the photonics component which reduces optical return loss.

20 Claims, 5 Drawing Sheets

(56) References Cited

U.S. PATENT DOCUMENTS

| | | | |
|---|---|---|---|
| 2003/0030814 A1* | 2/2003 | Osinski | G01C 19/72 356/461 |
| 2007/0099315 A1 | 5/2007 | Maa et al. | |
| 2008/0070355 A1 | 3/2008 | Lochtefeld et al. | |
| 2011/0037133 A1 | 2/2011 | Su et al. | |
| 2012/0213468 A1 | 8/2012 | Lipson et al. | |
| 2014/0044391 A1* | 2/2014 | Iizuka | H01S 5/0264 385/14 |
| 2014/0159183 A1 | 6/2014 | Na | |
| 2014/0185979 A1* | 7/2014 | Evans | G02B 6/12004 385/14 |
| 2014/0217269 A1* | 8/2014 | Guo | G02B 6/29346 250/227.14 |
| 2016/0155884 A1 | 6/2016 | Hon et al. | |
| 2018/0204761 A1 | 7/2018 | Feilchenfeld et al. | |
| 2021/0036479 A1* | 2/2021 | Bian | H01S 3/063 |

OTHER PUBLICATIONS

Knoll, "High-Performance BiCMOS Si Photonics Platform", IEEE, 2015, 9 pages.

Liao et al., "36 GHz submicron silicon waveguide germanium photodetector", Optics Express, vol. 19, Issue 11, May 20, 2011, 6 pages.

Huang et al., "Germanium on Silicon Avalanche Photodiode", IEEE Journal of Selected Topics in Quantum Electronics, vol. 24, No. 2, Mar./Apr. 2018, 11 pages.

Jutzi et al., "Ge-on-Si Vertical Incidence Photodiodes With 39-GHz Bandwidth", IEEE Photonics Technology Letters, vol. 17, Issue 7, Jul. 2005, 3 pages.

Koester et al., "Germanium-on-Insulator Photodetectors", IEEE, Oct. 2005, 3 pages.

Application and Drawings for U.S. Appl. No. 16/844,606, filed Apr. 9, 2020, 30 pages.

Application and Drawings for U.S. Appl. No. 16/887,375, filed May 29, 2020, 26 pages.

Application and Drawings for U.S. Appl. No. 16/544,074, filed Aug. 19, 2020, 26 pages.

Application and Drawings for U.S. Appl. No. 16/741,792, filed Jan. 14, 2020, 38 pages.

Liu et al., "A Thin X-Band Microwave Absorber Using a Center Shorted Spiral Medium", IEEE Antennas and Wireless Propagation Letters, vol. 8, 2009, 4 pages.

Varadan et al., "Smart skin spiral antenna with chiral absorber", downloaded Aug. 23, 2020; SPIEDigitalLibrary.org,conference-proceedings-of-spie, 13 pages.

Gong et al., "Perfect absorber supported by optical Tamm states in plasmonic waveguide", Optics Express, vol. 19, No. 19, Sep. 12, 2011, 6 pages.

Giewont et al., "300-mm Monolithic Silicon Photonics Foundry Technology", IEEE Journal of Selected Topics in Quantum Electronics, vol. 25, No. 5, Sep./Oct. 2019, 12 pages.

Rakowski et al., "45nm CMOS—Silicon Photonics Monolithic Technology (45CLO) for next-generation, low power and high speed optical interconnects", OFC 2020, 3 pages.

Application and Drawings for U.S. Appl. No. 16/935,854, filed Jul. 22, 2020, 26 pages.

Application and Drawings for U.S. Appl. No. 17/065,862, filed Oct. 8, 2020, 22 pages.

Application and Drawings for U.S. Appl. No. 17/031,032, filed Sep. 24, 2020, 32 pages.

\* cited by examiner

WAVEGUIDE ABSORBERS

FIELD OF THE INVENTION

The present disclosure relates to semiconductor structures and, more particularly, to waveguide absorbers and methods of manufacture.

BACKGROUND

Semiconductor optical waveguide structures (e.g., photonic components) are an important component of integrated optoelectronic systems. For example, a semiconductor optical waveguide structure is capable of guiding optical waves (e.g., light) with minimal loss of energy by restricting expansion of the light into the surrounding substrate. The optical waveguide structure can be used in many different applications including, e.g., semiconductor lasers, optical filters, switches, modulators, isolators, and photodetectors. The use of semiconductor material also enables monolithic integration into optoelectronic devices using known fabrication techniques.

Open or unconnected ports or other termination points of the photonics device can result in leakage or backscatter of the optical signal back into the chip. This can also cause crosstalk with other photonic devices, as well as overall interference of the optical signal. To prevent such issues from occurring, an absorber is coupled to the open or unconnected ports or other termination points of the photonics device. The absorbers are known to be manufactured from Ge material as they are easily integrated into the fabrication processes of the photonics devices. However, Ge absorbers suffer from relatively high optical return loss (e.g., back-reflection and backscatter) which, in turn, can significantly impede the optical strength of the signal. Backscattering into lasers can result in instability and additional laser noise. Additionally, it can lead to degraded high-speed signal integrity and increased bit-error-rate of communication links.

SUMMARY

In an aspect of the disclosure, a structure comprises: a photonics component; and a spirally configured waveguide absorber coupled to a node of the photonics component which reduces optical return loss.

In an aspect of the disclosure, a structure comprises: a semiconductor waveguide component; and a spirally configured waveguide absorber coupled to and integrated into a semiconductor monolithic structure with the semiconductor waveguide component, the spirally configured waveguide absorber being composed of Si, SiN or polysilicon.

In an aspect of the disclosure, a structure comprises: a semiconductor waveguide component; a rectangular or circular concentrically spiraled waveguide absorber; and a tapered coupler coupling the rectangular or circular concentrically spiraled waveguide absorber to the semiconductor waveguide component, the coupler including a first tapered portion of same material as the semiconductor waveguide component and a second tapered portion of a same material of the rectangular or circular concentrically spiraled waveguide absorber.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to semiconductor structures and, more particularly, to waveguide absorbers and methods of manufacture. More specifically, the present disclosure is directed to spiral waveguide absorbers. Advantageously, the spiral waveguide absorbers described herein offer simple and efficient ways to form absorbers without the need of introducing absorption material such as Ge, and while significantly reducing optical return loss. The spiral waveguide absorbers can also be manufactured without the need for introducing additional fabrication steps.

The spiral waveguide absorbers described herein provide loss mechanisms, e.g., bending loss and propagation loss, of the optical signal to reduce optical return loss. For example, bending loss provides a radiation loss through the curved structure and a mode-mismatching loss between the straight and bent portions of the waveguide absorber. As to the propagation loss, the spiral waveguide absorbers described herein provide a scattering loss induced by sidewall roughness.

The waveguide absorbers of the present disclosure can be manufactured in a number of ways using a number of different tools. In general, though, the methodologies and tools are used to form structures with dimensions in the micrometer and nanometer scale. The methodologies, i.e., technologies, employed to manufacture the waveguide absorbers of the present disclosure have been adopted from integrated circuit (IC) technology. For example, the structures are built on wafers and are realized in films of material patterned by photolithographic processes on the top of a wafer. In particular, the fabrication of the waveguide absorbers use three basic building blocks: (i) deposition of thin films of material on a substrate, (ii) applying a patterned mask on top of the films by photolithographic imaging, and (iii) etching the films selectively to the mask.

Figure 1:
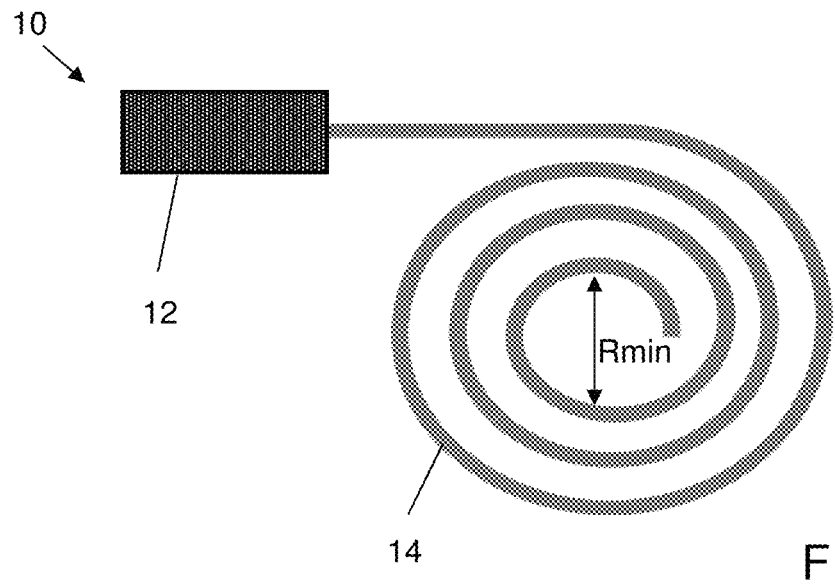
FIG. 1 shows a waveguide absorber, amongst other features, in accordance with aspects of the present disclosure.

FIG. 1 shows a waveguide absorber, amongst other features, in accordance with aspects of the present disclosure. In particular, the structure 10 of FIG. 1 includes one or more photonics components 12 coupled to a waveguide absorber 14. More specifically, the waveguide absorber 14 is coupled to an open or unconnected port or other termination point (hereinafter referred to as a node) of the one or more photonics components 12.

In embodiments, the photonics components 12 can be representative of one or more photonic waveguide component as should be understood by those of skill in the art. For example, the one or more photonics component 12 can be a waveguide structure composed of semiconductor material including, e.g., Si or SiN. The Si material can be, for example, silicon-on-insulator technologies; whereas, the SiN can be fully or partially etched material on an oxide material. In the Si implementation, the photonics components 12 can be patterned directly from the Si of the silicon-on-insulator technologies using conventional CMOS fabrication processes as discussed herein, including a thinning of the material.

Still referring to FIG. 1, the waveguide absorber 14 is provided in a spiral configuration. More specifically, the waveguide absorber 14 is configured in a spiral configuration of concentrically positioned spirals (e.g., circles). The waveguide absorber 14 can include any number of concentric circles, e.g., four, depending on the desired loss mechanism and material composition implemented in fabricating of the waveguide absorber 14 as described herein. In embodiments, the sidewalls of the waveguide absorber 14 can be roughened. In addition, in a SiN implementation (and, in embodiments, composed of other material compositions), the waveguide absorber 14 can include narrow waveguide features which exhibit relatively weak confinement to increase the propagation loss and shrink the total length of the spiral waveguide absorber 14.

The waveguide absorber 14 can be composed of Si material, SiN or polysilicon material, as examples, in a monolithic integration with the photonic components 12 (e.g., waveguide structures). In further embodiments, the waveguide absorber 14 can be composed of other dielectric materials or other combinations of materials as described with respect to at least FIGS. 6-8. By way of non-limiting examples, the waveguide absorber 14 can be composed of the following materials: $HfO_2$ (refractive index n=2.0754 @ 1.31 um 2.0709 @ 1.55 um); $ZrO_2$ (Zirconium dioxide, Zirconia) (n=2.1155 @ 1.31 um n=2.1103 @1.55 um); $Si_3N_4$ (n=~2 @ 1.31 um, 1.55 um); SiON, AlN; $TiO_2$ (Titanium dioxide) (n=2.4622 @ 1.31 um n=2.4538 @1.55 um); ZnO (Zinc monoxide) (n=1.9318 @ 1.31 um n=1.9267 @1.55 um); $Al_2O_3$ (n=1.7503 @ 1.31 um, 1.7462 @ 1.55 um); MgO (n=1.7178 @ 1.31 um 1.7146 @ 1.55 um); $SiO_2$ (n=1.45 @ 1.31 um, 1.55 um); $CaF_2$ (n=1.4272 @ 1.31 um, 1.4260 @1.55 um); SiCOH (n=1.406 @ 1.31 um, 1.55 um); $MgF_2$ (n=1.3718 @ 1.31 um, 1.3705 @ 1.55 um); and polymer III-V materials, etc.

Figure 2:
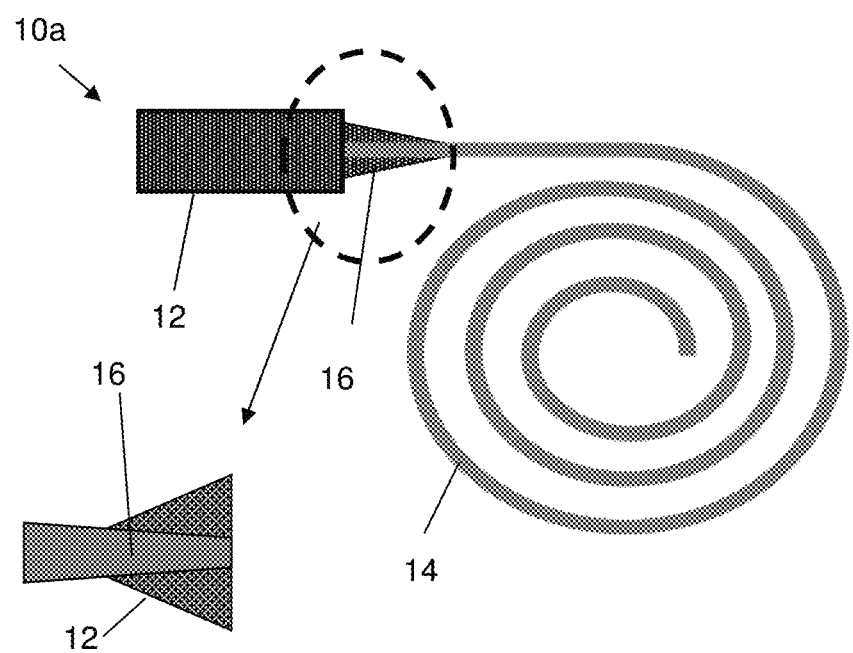
FIG. 2 shows a waveguide absorber with a coupler, amongst other features, in accordance with aspects of the present disclosure.

The waveguide absorber 14 can include other combinations of materials. For example, the waveguide absorber 14 can be a germanium based absorber. Specifically, the waveguide absorber 14 can be Ge-on-Si or SiN-on-Ge-on-Si waveguide absorber as described further with respect to FIGS. 6-8. In embodiments, the Ge-on-Si or SiN-on-Ge-on-Si absorber with silicon photonic waveguides and components can be a monolithic integration. In each of these embodiments, a coupler (as shown in FIG. 2 at reference numeral 16) can be composed of different materials, depending on the combination of materials of the waveguide absorber 14. In these embodiments, the waveguide absorber 14 can be tapered as it spirals.

Depending on the dimension of the waveguide absorber 14 (e.g., width, thickness) and the material composition, the radius and number of the spirals can vary in the waveguide absorber 14. For example, for a Si waveguide absorber (n=3.5 @ lambda=1310 nm), the configuration can be, e.g., 5 spirals, Rmin=1 um, (width: 0.3~0.4*lambda, thickness: 0.1~0.2*lambda) @ lambda=1310 nm. For a SiN waveguide absorber (n=2), the material index is smaller and confinement is worse so the bending loss is higher and, hence, less spiral/turns or smaller bending radius would be required, e.g., 3 spirals, Rmin=0.8 um. Moreover, if the input light is working at the transverse-electric (TE) mode, it is possible to shrink the width of the waveguide absorber 14 to reduce the confinement and increase the bending loss. For example, in the TE mode, it is contemplated to reduce the number of the spirals or have a smaller bending radius or both. On the other hand, if the input light is working at the transverse-magnetic (TM) mode, it is possible to shrink the waveguide absorber 14 thickness to reduce the confinement and increase the bending loss. In this scenario, it is possible to reduce the number of the spirals or have a smaller bending radius or both. In addition, with narrow SiN spiral waveguide absorber designs with tight bends, the footprint can be pushed below, e.g., 3 µm*3 µm.

In an example embodiment with the innermost spiral at a radius of approximately 1 µm and the material composition being Si, modeling results show a back reflection of 38 dB and an insertion loss of 51.2 dB, compared to back reflection of 18.7 dB and an insertion loss of 4.7 dB for a conventional straight Ge absorber. Accordingly, the Si waveguide spiral absorber exhibits significantly lower back reflection and better absorption (higher attenuation) compared to Ge-based absorbers. In addition, it has been found that a waveguide absorber composed of polysilicon material will have a much larger propagation loss compared to its Si counterpart (e.g., >10 dB/cm vs. 2 dB/cm), which can be used to further reduce the number of rings (e.g., concentric spirals) and shrink the device footprint.

Figure 5A:
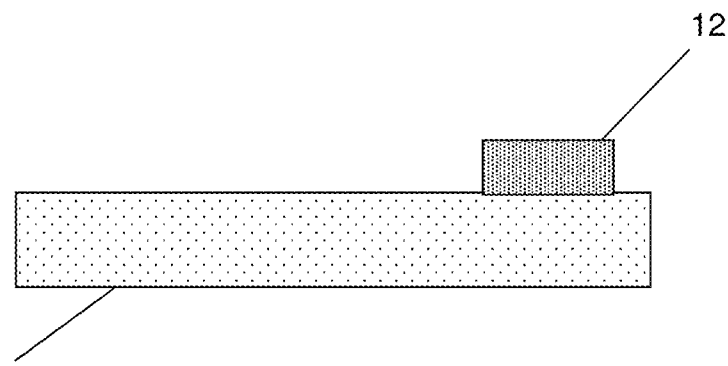
FIGS. 5A-5C show exemplary fabrication processes of the dielectric waveguide absorber in accordance with aspects of the present disclosure.
Figure 5B:
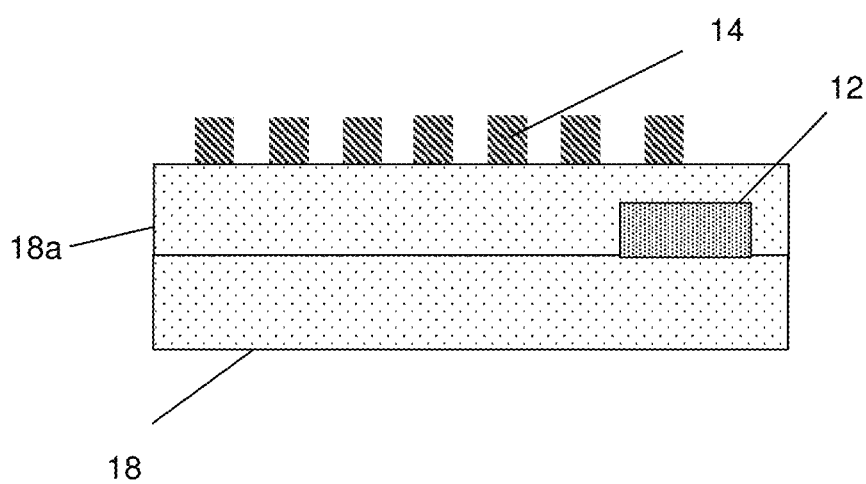
Figure 5C:
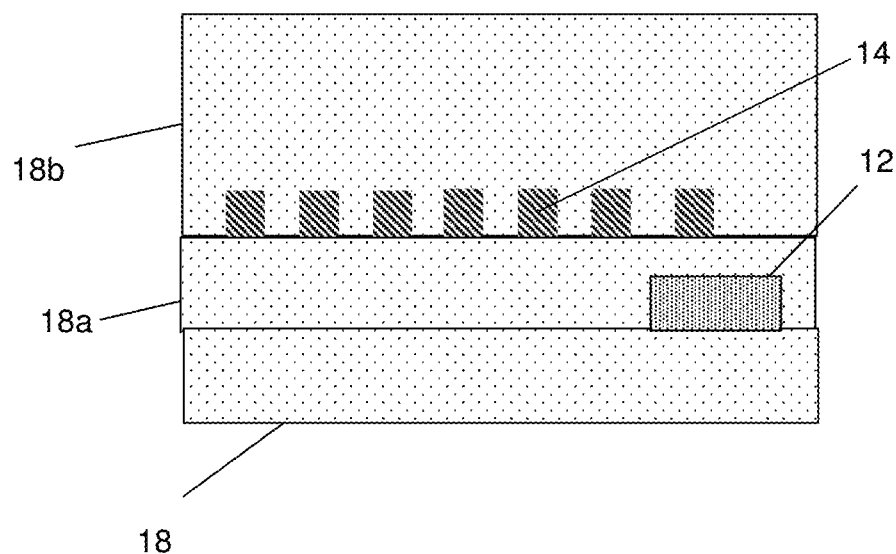

Still referring to FIG. 1, in embodiments, any combination of materials disclosed herein for the one or more photonics components 12 can be used with any materials disclosed herein for the waveguide absorber 14. For example, an Si, SiN or polysilicon waveguide absorber 14 can be coupled to waveguide components 12 composed of either Si or SiN. Of course, other combinations of materials are contemplated herein. In embodiments, the waveguide absorber 14 and the photonics components 12 can be provided on different levels of the structure with a dielectric material (oxide) disposed therebetween as shown in FIGS. 5A-5C.

FIG. 2 shows a waveguide absorber with a coupler, amongst other features, in accordance with aspects of the present disclosure. In this configuration, the structure 10a includes a coupler 16 interposed between the waveguide absorber 14 and the photonics components 12. In embodiments, the coupler 16 can be used when the material composition of the waveguide absorber 14 and the material composition of the photonics components 12 are mismatched (e.g., not the same materials). For example, the coupler 16 can be composed of a SiN component, Si component, Ge component and/or polysilicon component depending on the materials used with the dielectric waveguide absorber 14 and the photonics components 12.

More specifically, the coupler 16 can include, a tapered SiN component in combination with an overlaid (overlapping) tapered Si component when the photonics component 12 is SiN material and the waveguide absorber 14 is Si material, respectively. In yet another embodiment, a tapered Si component in combination with an overlaid (overlapping) tapered SiN component can be used when the photonics component 12 is Si material and the waveguide absorber 14 is SiN material, respectively. In still another embodiment, a tapered SiN component in combination with an overlaid (overlapping) tapered polysilicon component can be used when the photonics component 12 is SiN material and the dielectric waveguide absorber 14 is polysilicon material, respectively. In addition, a tapered Si component in combination with an overlaid (overlapping) tapered polysilicon component will be used when the photonics component 12 is Si material and the waveguide absorber 14 is a polysilicon material, respectively. Other tapered configurations are also contemplated herein. Moreover, in embodiments, the waveguide absorber 14 does not require a tapered portions, i.e., for cases when the photonics component is Si or SiN, as examples.

In further embodiments, the coupler 16 can be composed of single material (e.g. Si or SiN), but with different etching depths (e.g. the component for the waveguide is fully-etched Si waveguide and the component for the spiral waveguide absorber is partially etched Si waveguide. In further embodiments, the coupler 16 can be composed of two components based on partially etched Si waveguide, but with different etching depths (e.g., slab thicknesses). In yet further embodiments, the coupler 16 can be composed of two different materials (e.g. Si and SiN) (e.g., the converter is used to connect Si component and SiN spiral waveguide absorber; or vice versa.

In any of the embodiments described herein, the tapered coupler component associated with the photonics component 12 will have a larger area and/or cross-section than the tapered coupler component associated with the dielectric waveguide absorber 14. Moreover, the coupler components for both the waveguide absorber 14 and the photonics components 12 can be fully or partially (e.g., thinned material) etched material.

Figure 3:
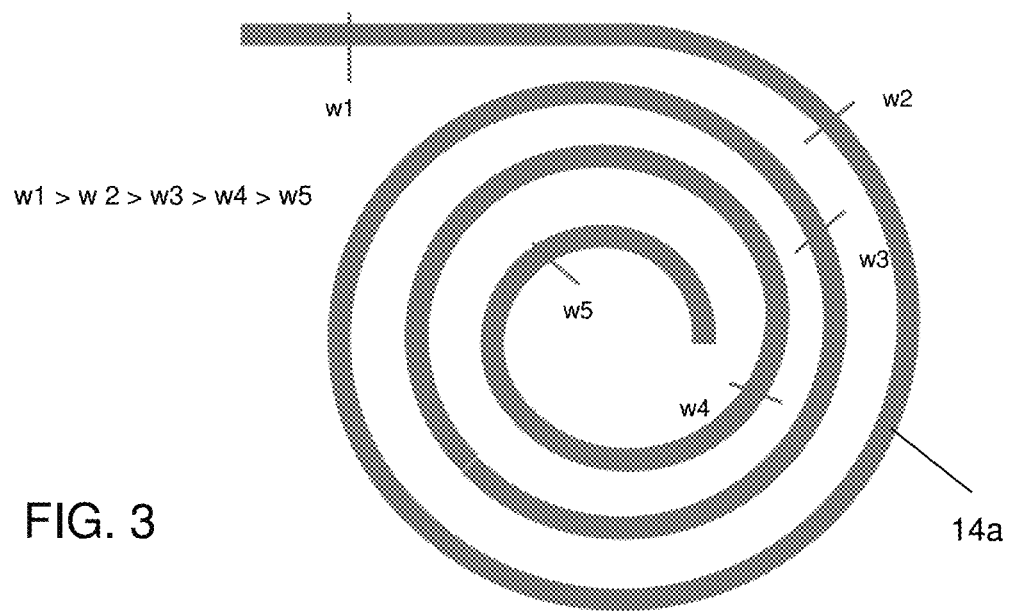
FIG. 3 shows a waveguide absorber in accordance with additional aspects of the present disclosure.

FIG. 3 shows a dielectric waveguide absorber in accordance with another aspect of the present disclosure. In this configuration, the waveguide absorber 14a will gradually decrease in its width starting from the starting point (e.g., where is couples with the photonics components 12) to its terminal point (e.g., end), i.e., the width of the spiral waveguide varies along the turns (propagation length). For example, w1>w2>w3>w4>w5. It should be understood by those of ordinary skill in the art that different widths and placement of the transition of the widths is contemplated herein and that the example shown in FIG. 3 is a non-limiting illustration of a configuration with gradually decreasing widths. By way of example, the widths can range from about 0.05*lambda to about 5*lambda.

Figure 4:
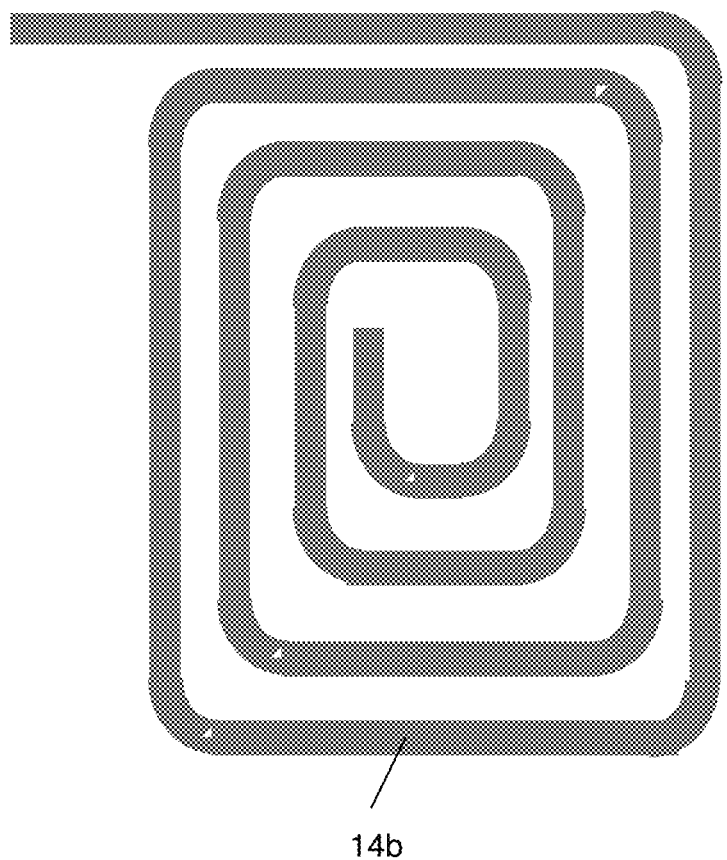
FIG. 4 shows a waveguide absorber in accordance with additional aspects of the present disclosure.

FIG. 4 shows a waveguide absorber in accordance with additional aspects of the present disclosure. More specifically, the waveguide absorber 14b of FIG. 4 is provided in a rectangular spiral configuration. In this rectangular spiral configuration, the waveguide absorber 14b includes rounded or curved corners. And, similar to the spiral configuration shown in FIG. 1, for example, the waveguide absorber 14b can include any number of concentric features, e.g., four, and material compositions depending on the desired return loss of the waveguide absorber 14b.

Still referring to FIG. 4, it is also contemplated that each leg or each concentrically positioned set of adjacent legs composed of a rectangular feature or partial rectangular feature of the rectangular spiral configuration can have different widths, much like the waveguide absorber shown in FIG. 3. For example, the width of the legs or concentrically positioned set of adjacent legs can gradually narrow from the starting point to its termination point. In any scenario, though, the waveguide absorber 14b will effectively reduce optical return loss as described herein.

FIGS. 5A-5C show exemplary fabrication processes of the dielectric waveguide absorber in accordance with aspects of the present disclosure. In particular, FIG. 5A shows a starting structure including a photonics component 12 fabricated on a buried oxide layer 18. In this example, the photonics component 12 is fabricated from Si material and, more particularly, semiconductor-on-insulator (SOI) material by using conventional lithography and etching processes. For example, a resist formed over the semiconductor material is exposed to energy (light) to form a pattern (opening). An etching process with a selective chemistry, e.g., reactive ion etching (RIE), will be used to pattern the semiconductor material to form one or more photonics components 12. The patterned one or more components can also include the tapered coupler. The resist can then be removed by a conventional oxygen ashing process or other known stripants.

It should be understood by those of skill in the art that the lithography and etching processes can be performed on other materials, e.g., SiN material, for forming the one or more photonics components 12. In this implementation, an insulator material will be deposited over the SOI or other material, followed by deposition of the SiN material. The SiN material can then be patterned to form the one or more photonics components 12.

As shown in FIG. 5B, following the resist removal, insulator material 18a is deposited over the one or more photonics components 12. The insulator material 18a can be an oxide material deposited by conventional deposition processes, e.g., chemical vapor deposition. Thereafter, waveguide absorber material is deposited on the insulator material 18a. The waveguide absorber material can be, for example, Si, SiN, polysilicon material or other materials described herein. The waveguide absorber material undergoes a patterning process as described above to fabricate the spirals of the waveguide absorber 14. As noted herein, the waveguide absorber 14 can include any number of spirals depending on the material composition of the absorber and required return loss. It should be also understood that the patterning step can include the patterning of the tapered coupler for the waveguide absorber 14. In FIG. 5C, additional insulator material 18b is deposited by conventional deposition processes, e.g., chemical vapor deposition, over the waveguide absorber 14.

Figure 6:
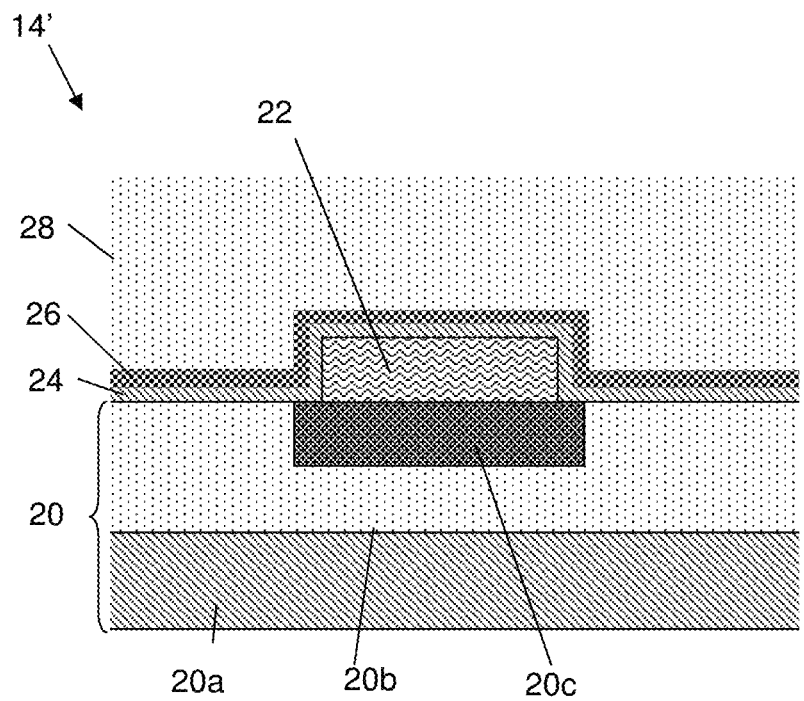
FIG. 6 shows a cross-sectional view of a waveguide absorber composed of a combination of semiconductor materials, amongst other features, and respective fabrication processes in accordance with aspects of the present disclosure.

FIG. 6 shows a cross-sectional view of a waveguide absorber 14' composed of a combination of semiconductor materials. Specifically, the waveguide absorber 14' is composed of a combination of Ge material and Si material. More specifically, in embodiments, the waveguide absorber 14' is fabricating using a semiconductor (e.g., silicon) on insulator substrate 20. The semiconductor (e.g., silicon) on insulator substrate 20 includes a buried oxide (BOX) layer 20b on a semiconductor wafer 20a. A semiconductor material 20c, e.g., Si, is formed on the BOX layer 20b. In embodiments, the semiconductor material 20c can be formed on the BOX layer 20b using conventional fabrication processes, e.g., SiMOX.

Prior to forming of Ge material 22, the semiconductor material 20c is cleaned to remove any oxidation (e.g., $SiO_2$). The cleaning process can be any conventional cleaning process, e.g., using HF chemistries. The semiconductor material 20c is also patterned into a spiral configuration as described herein. A mask is formed on the semiconductor material 20c, which is opened to expose a portion of the semiconductor material 20c. The Ge material 22 is then epitaxially grown in this opening (e.g., window), directly on the semiconductor material 20c. In embodiments, the Ge material 20 is preferably narrower than the semiconductor material 20c; although, the Ge material 22 can be grown to the same width of the semiconductor material 20c.

Still referring to FIG. 6, after the growth process, the mask and any overgrowth of Ge material 22 is removed, with the remaining Ge material 22 cleaned to remove any oxide or other impurities. One or more passivation layers are formed on the Ge material 22. Specifically, $SiO_2$ material 24 is deposited on the Ge material 22, followed by SiN material 26. In embodiments, the $SiO_2$ material 24 and SiN material 26 can be deposited using conventional deposition processes. For example, the $SiO_2$ material 24 and SiN material 26 can be deposited using CVD, atomic layer deposition (ALD) or plasma vapor deposition (PVD) processes. The $SiO_2$ material 24 can be deposited to a thickness of a few nanometers, whereas, the SiN material 26 can be deposited to a thickness of about 10 nm to about 100 nm. As should be understood by those of skill in the art, the $SiO_2$ material 24 and SiN material 26 will encapsulate or seal the Ge material 22, preventing any oxidation occurring on the Ge material 22 during subsequent fabrication processes, e.g., the deposition of the interlayer dielectric layer 28.

Figure 7:
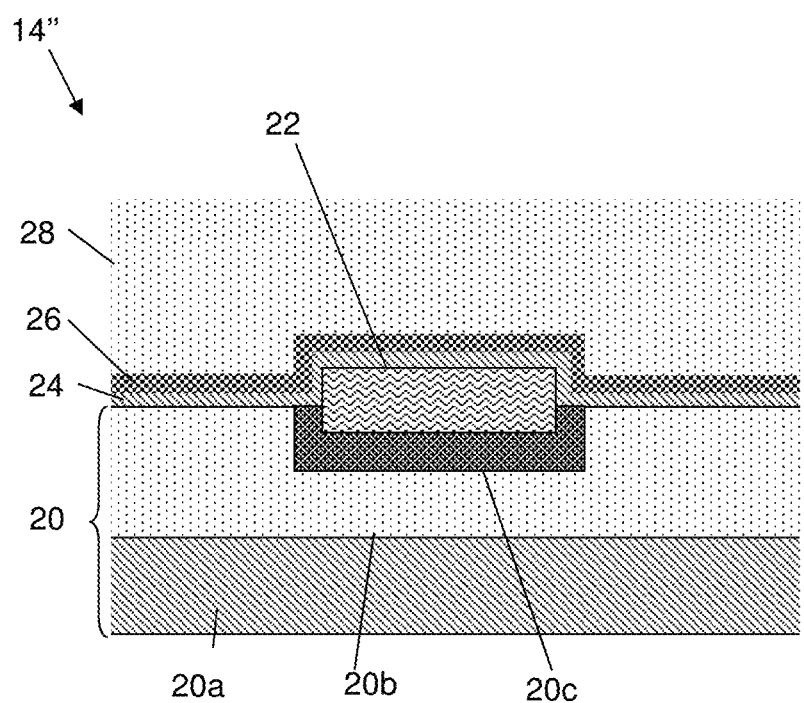
FIG. 7 shows a cross-sectional view of a waveguide absorber composed of a combination of semiconductor materials, amongst other features, and respective fabrication processes in accordance with yet additional aspects of the present disclosure.

FIG. 7 shows a cross-sectional view of a waveguide absorber 14" composed of a combination of semiconductor materials in accordance with additional aspects of the present disclosure. In this waveguide absorber 14", the semiconductor material 20c is partially recessed prior to the epitaxial growth of the Ge material 22. In embodiments, the semiconductor material 20c is partially recessed using a timed selective etching process with directional etching chemistries. The timed selective etching process also serves to remove any residual oxide material (e.g., $SiO_2$), which eliminates the need for a separate cleaning step of the semiconductor material 20c. In this embodiment, it is possible to achieve improved coupling between the semiconductor material 20c and the Ge material 22, as the Ge material 22 is grown within the recessed portion of the semiconductor material 20c.

Figure 8A:
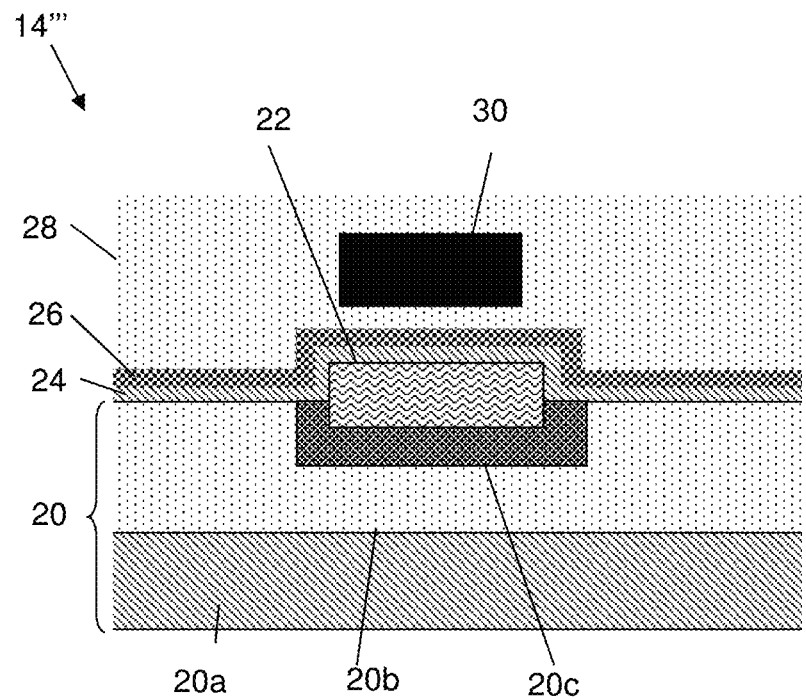
FIGS. 8A and 8B show cross-sectional views of a waveguide absorber composed of a combination of semiconductor materials, amongst other features, and respective fabrication processes in accordance with yet additional aspects of the present disclosure.
Figure 8B:
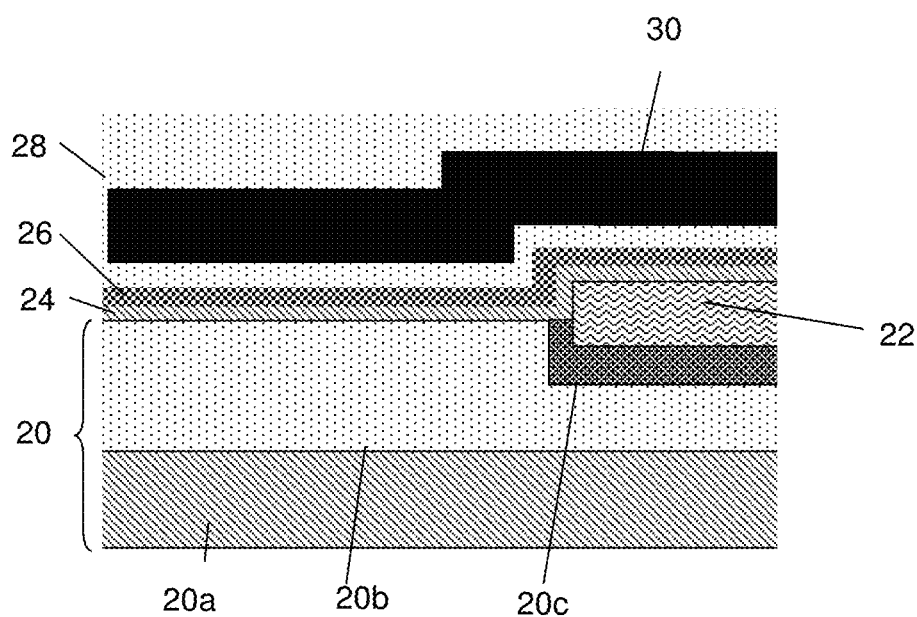

FIGS. 8A and 8B show cross-sectional views of a waveguide absorber 14''' with SiN material 30 deposited over the Ge material 22. More specifically, FIG. 8A is a cross-sectional view along a width of the waveguide absorber 14"; whereas, FIG. 8B is a side cross-sectional view. As in the embodiment shown in FIG. 7, the Ge material 22 is recessed within the partially etched semiconductor material 20c. In embodiments, the SiN material 30 is representative of the photonic components. It should be understood by those of skill in the art that the configuration/arrangement of materials, e.g., SiN material 30, can also be implemented in the embodiment shown in FIG. 6. Also, by utilizing the SiN material 30, it is also possible to form the waveguide components (including the absorber) on a bulk wafer (instead of semiconductor (e.g., silicon) on insulator technologies.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure comprising:
   a photonics component; and
   a spirally configured waveguide absorber comprising an input end that is coupled to a node of the photonics component which reduces optical return loss,
   wherein the spirally configured waveguide absorber is composed of a combination of semiconductor materials, with at least one passivation layer contacting a first of the semiconductor materials and with another passivation layer encapsulates or seals the first of two semiconductor materials.

2. The structure of claim 1, wherein the photonics component is a photonic waveguide structure composed of Si or SiN.

3. The structure of claim 2, wherein the spirally configured waveguide absorber and the photonics component is integrated into a semiconductor monolithic structure.

4. The structure of claim 2, wherein the Si material is silicon on insulator (SOI) technologies.

5. The structure of claim 2, wherein the spirally configured waveguide absorber is composed of dielectric material.

6. The structure of claim 2, wherein the spirally configured waveguide absorber is composed of Si, SiN or polysilicon.

7. The structure of claim 6, wherein the spirally configured waveguide absorber is concentrically placed spiral circular turns or concentrically placed rectangular turns.

8. The structure of claim 1, further comprising a coupler coupling the spirally configured waveguide absorber to the photonics component and the photonics component comprises a different material than the spirally configured waveguide absorber.

9. The structure of claim 8, wherein the coupler includes a first tapered portion extending from the photonics component and a second tapered portion extending from the spirally configured waveguide absorber.

10. The structure of claim 1, wherein the waveguide absorber includes roughened sides.

11. The structure of claim 1, wherein the semiconductor materials of the spirally configured waveguide absorber are composed of a combination of Ge material and Si material, with a first passivation layer contacting the Ge material, the another passivation layer composed of SiN layer contacting the first passivation layer, and the first passivation layer and the SiN material encapsulating or sealing the Ge material.

12. A structure comprising:
a semiconductor waveguide component; and
a spirally configured waveguide absorber coupled to and integrated into a semiconductor monolithic structure with the semiconductor waveguide component, the spirally configured waveguide absorber comprising a combination of Ge material and Si material, with one or more passivation layers contacting the Ge material and a SiN layer contacting the one or more passivation layers, the one or more passivation layers and the SiN material encapsulating or sealing the Ge material.

13. The structure of claim 12, wherein the spirally configured waveguide absorber is concentrically placed spiral circular turns or concentrically placed rectangular turns.

14. The structure of claim 12, wherein the spirally configured waveguide absorber is composed of dielectric material or polysilicon and a tapered coupler couples the spirally configured waveguide absorber to the semiconductor waveguide component.

15. The structure of claim 14, wherein the coupler includes a first tapered portion of same material as the semiconductor waveguide component and a second tapered portion of a same material of the spirally configured waveguide absorber.

16. The structure of claim 14, wherein the coupler includes a first tapered portion and a second tapered portion of a same material with different etching depths.

17. The structure of claim 12, wherein the waveguide absorber includes roughened sides.

18. A structure comprising:
a semiconductor waveguide component;
a rectangular or circular concentrically spiraled waveguide absorber composed of dielectric material or poly silicon; and
a tapered coupler coupling the rectangular or circular concentrically spiraled waveguide absorber to the semiconductor waveguide component, the coupler including a first tapered portion of same material as the semiconductor waveguide component and a second tapered portion of a same material of the rectangular or circular concentrically spiraled waveguide absorber,
wherein the first tapered portion and the second tapered portion comprise a same material with different etching depths.

19. The structure of claim 11, wherein the spirally configured waveguide absorber comprises dielectric material or polysilicon and further comprising a tapered coupler coupling the spirally configured waveguide absorber to the semiconductor waveguide component, wherein the coupler includes a first tapered portion and a second tapered portion of a same material with different etching depths.

20. The structure of claim 11, wherein the Si material is recessed and the Ge material is located within the recess of the Si material.

* * * * *